(12) United States Patent
Furiya et al.

(10) Patent No.: US 10,726,989 B2
(45) Date of Patent: Jul. 28, 2020

(54) COIL DEVICE

(71) Applicant: IHI Corporation, Tokyo (JP)

(72) Inventors: Kentarou Furiya, Koto-ku (JP);
Susumu Tokura, Koto-ku (JP); Kenji Nishimura, Koto-ku (JP); Jun Araki, Koto-ku (JP); Hideki Nagano, Koto-ku (JP)

(73) Assignee: IHI Corporation, Tokyo (JP)

( * ) Notice: Subject to any disclaimer, the term of this patent is extended or adjusted under 35 U.S.C. 154(b) by 107 days.

(21) Appl. No.: 15/775,174

(22) PCT Filed: Oct. 14, 2016

(86) PCT No.: PCT/JP2016/080578
§ 371 (c)(1),
(2) Date: May 10, 2018

(87) PCT Pub. No.: WO2017/094367
PCT Pub. Date: Jun. 8, 2017

(65) Prior Publication Data
US 2018/0358168 A1  Dec. 13, 2018

(30) Foreign Application Priority Data
Dec. 1, 2015 (JP) .................................. 2015-234921

(51) Int. Cl.
*H01F 27/24* (2006.01)
*H01F 27/28* (2006.01)
(Continued)

(52) U.S. Cl.
CPC ........... *H01F 27/2823* (2013.01); *H01F 5/00* (2013.01); *H01F 27/24* (2013.01); *H01F 27/2828* (2013.01); *H01F 27/365* (2013.01);
*H01F 27/38* (2013.01); *H01F 38/14* (2013.01); *H02J 50/10* (2016.02)

(58) Field of Classification Search
CPC ........ H01F 5/00; H01F 27/2823; H01F 27/27; H01F 27/24; H01F 27/2828; H01F 27/365; H01F 38/14; H01F 41/07; H02J 50/10
USPC ....... 336/220, 222, 232, 192, 146, 147, 225; 320/108, 109
See application file for complete search history.

(56) References Cited

U.S. PATENT DOCUMENTS 5,929,738 A * 7/1999 Orlando .................. H01F 19/04
 336/12
8,869,383 B2 * 10/2014 Xu ......................... H01F 17/062
 29/602.1
(Continued)

FOREIGN PATENT DOCUMENTS

CN 201928466 U 8/2011
CN 102457108 A 5/2012
(Continued)

*Primary Examiner* — Mang Tin Bik Lian
(74) *Attorney, Agent, or Firm* — Volpe and Koenig, P.C.

(57) ABSTRACT

A power transmission coil device includes a first helical coil having a first conductive wire forming a helical shape around an axis, and a second helical coil having a second conductive wire forming a helical shape around the axis, in which the first helical coil is electrically connected in parallel to the second helical coil, and the first conductive wire and the second conductive wire arranged along a direction of the axis.

8 Claims, 10 Drawing Sheets

(51) Int. Cl.
*H02J 50/10* (2016.01)
*H01F 38/14* (2006.01)
*H01F 5/00* (2006.01)
*H01F 27/36* (2006.01)
*H01F 27/38* (2006.01)

(56) References Cited

U.S. PATENT DOCUMENTS

| | | | |
|---|---|---|---|
| 2008/0106253 A1* | 5/2008 | Kojovic | G01R 15/181 324/127 |
| 2011/0198940 A1 | 8/2011 | Urano | |
| 2012/0217819 A1 | 8/2012 | Yamakawa et al. | |
| 2014/0054973 A1* | 2/2014 | Asanuma | H01F 27/2871 307/104 |
| 2014/0340027 A1* | 11/2014 | Keeling | H02J 50/10 320/108 |
| 2015/0333532 A1 | 11/2015 | Han et al. | |
| 2016/0064137 A1* | 3/2016 | Perez | H01F 27/2823 |
| 2017/0103849 A1 | 4/2017 | Leem | |

FOREIGN PATENT DOCUMENTS

| | | |
|---|---|---|
| CN | 103348561 A | 10/2013 |
| CN | 105099000 A | 11/2015 |
| JP | 2002-280154 A | 9/2002 |
| JP | 2008-136311 A | 6/2008 |
| JP | 2010-040699 A | 2/2010 |
| JP | 2011-086890 A | 4/2011 |
| JP | 2012-110080 A | 6/2012 |
| JP | 2012-120410 A | 6/2012 |
| JP | 2013-017255 A | 1/2013 |
| JP | 2013-051285 A | 3/2013 |
| JP | 2013-229401 A | 11/2013 |
| JP | 2013-251455 A | 12/2013 |
| JP | 2014-116543 A | 6/2014 |
| JP | 2017-077166 A | 4/2017 |
| WO | 2012/127953 A1 | 9/2012 |

* cited by examiner

COIL DEVICE

TECHNICAL FIELD

The present disclosure relates to a coil device.

BACKGROUND ART

A wireless power transfer system has been known as a device for transmitting power. The wireless power transfer system is a power feeding system using electromagnetic induction or magnetic resonance by a coil, etc. This system transmits power from a power transmitter to a power receiver which is not in direct contact with the power transmitter. For example, this system is applied to a system for charging a movable object that uses electricity as an energy source such as an electric vehicle or a plug-in hybrid vehicle. In such a charging system, the power receiver is attached to a chassis, etc. of the electric vehicle, and the power transmitter is disposed below the vehicle.

A technology described in Patent Literature 1 is known as a coil device used for the wireless power transfer system. This coil device has a plurality of substrates provided with a coil conductor wound in a helical shape. The substrates are stacked in a thickness direction thereof. Further, the coil conductor is regarded as one conductor.

CITATION LIST

Patent Literature

Patent Literature 1: Japanese Unexamined Patent Publication No. 2011-86890

SUMMARY OF INVENTION

Technical Problem

Power efficiency between coils is based on inductances of the coils. In this regard, in the coil device of Patent Literature 1, the number of turns of a coil is increased to increase an inductance. However, when the number of turns is increased, a conductive wire of the coil becomes longer, and thus electric resistance of the conductive wire becomes larger. When the electric resistance becomes larger, copper loss occurs, and thus the coil generates Joule heat. When Joule heat is generated, power efficiency decreases.

In the disclosure, a description will be given of a coil device capable of suppressing generation of Joule heat while ensuring a desired inductance.

Solution to Problem

An aspect of the disclosure is a coil device including a first helical coil having a first conductive wire forming a helical shape around an axis, and a second helical coil having a second conductive wire forming a helical shape around the axis, in which the first helical coil is electrically connected in parallel to the second helical coil, and the first conductive wire is adjacent to the second conductive wire in a direction of the axis.

Advantageous Effects of Invention

According to a coil device of the disclosure, it is possible to suppress generation of Joule heat while ensuring a desired inductance.

DESCRIPTION OF EMBODIMENTS

Figure 1:
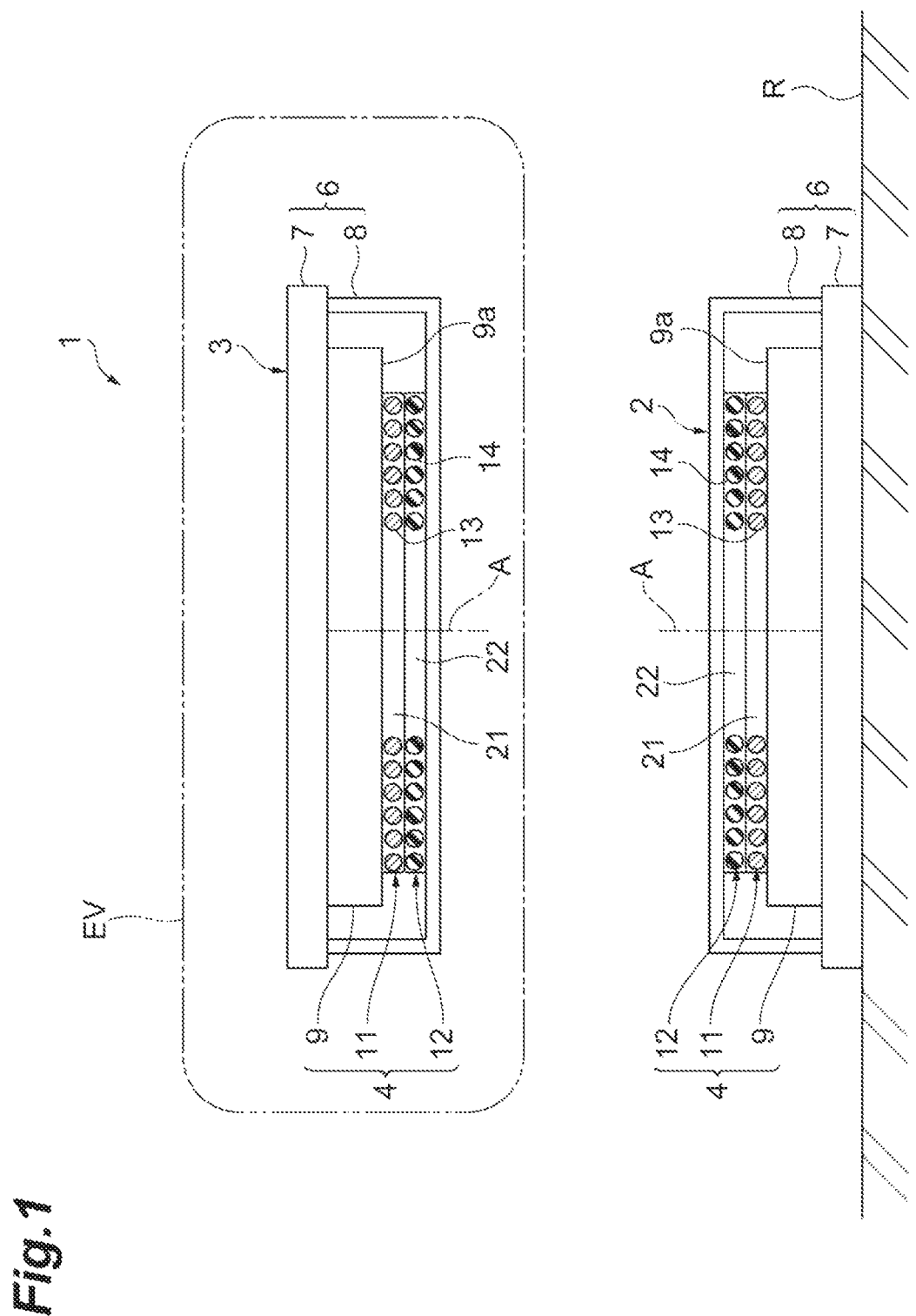
FIG. 1 is a cross-sectional view illustrating a configuration of a wireless power transfer system including a power transmission coil device according to a first embodiment of the disclosure.

An aspect of the disclosure is a coil device including a first helical coil having a first conductive wire forming a helical shape around an axis, and a second helical coil having a second conductive wire forming a helical shape around the axis, in which the first helical coil is electrically connected in parallel to the second helical coil, and the first conductive wire is adjacent to the second conductive wire in a direction of the axis.

A power transmission coil device includes the first helical coil and the second helical coil corresponding to two helical coils. Therefore, the power transmission coil device is considered to be a device obtained by magnetically coupling the first helical coil and the second helical coil. Further, an inductance corresponding to a degree of this coupling corresponds to a total inductance of the power transmission coil device. In the power transmission coil device, the first conductive wire is adjacent to the second conductive wire in the direction of the axis. According to such an arrangement, a degree of magnetic coupling between a magnetic field generated by the first conductive wire and a magnetic field generated by the second conductive wire increases. In addition, inductances of the first helical coil and the second helical coil are affected by temperatures of the first helical coil and the second helical coil. In this power transmission coil device, the first conductive wire and the second conductive wire are connected in parallel. According to such a parallel connection, electric resistance of the power transmission coil device is smaller than electric resistance per one of the first helical coil or the second helical coil. Then, generation of Joule heat of the first helical coil and the second helical coil is suppressed. Therefore, in the power transmission coil device, a degree of magnetic coupling affecting the total inductance is ensured at a desired value, and generation of Joule heat is suppressed. In this way, the power transmission coil device may suppress generation of Joule heat while ensuring a desired inductance.

In some aspects, the coil device may further include a magnetic member including a main surface intersecting the axis, the first helical coil may have a first inductance based on a distance between the first conductive wire and the main surface, the second helical coil may have a second inductance based on a distance between the second conductive wire and the main surface, and the first helical coil and the second helical coil may be configured such that a difference between the first inductance and the second inductance is small. According to a configuration in which the difference between the first inductance and the second inductance is set to be small, a difference between a current flowing through the first helical coil and a current flowing through a second helical coil is smaller. That is, a deviation of current in the first helical coil and the second helical coil is suppressed. When the deviation of current is suppressed, generation of Joule heat in the first helical coil and the second helical coil is suppressed.

In some aspects, in the coil device, each of the first conductive wire and the second conductive wire may be disposed in a first coil layer and disposed in a second coil layer apart from the first coil layer in the direction of the axis. According to this arrangement, a difference between an average distance from a ferrite plate to the first helical coil and an average distance from the ferrite plate to the second helical coil becomes smaller. Therefore, generation of Joule heat resulting from the deviation of current is suppressed.

In some aspects, in the coil device, the first conductive wire and the second conductive wire may be alternately disposed in the first coil layer and the second coil layer along a direction intersecting the axis. According to this arrangement, a difference between an average distance from the ferrite plate to the first helical coil and an average distance from the ferrite plate to the second helical coil becomes smaller. Therefore, generation of Joule heat resulting from the deviation of current is suppressed.

In some aspects, the first conductive wire may be disposed on an outer side of the second conductive wire in the first coil layer, the number of turns of the first conductive wire may be smaller than the number of turns of the second conductive wire in the first coil layer, the second conductive wire may be disposed on an outer side of the first conductive wire in the second coil layer, and the number of turns of the second conductive wire may be smaller than the number of turns of the first conductive wire in the second coil layer. According to this arrangement, a difference between an average distance from the ferrite plate to the first helical coil and an average distance from the ferrite plate to the second helical coil becomes smaller. In addition, in the first conductive wire and the second conductive wire, the number of times of change of arrangement from the first coil layer to the second coil layer and the number of times of change of arrangement from the second coil layer to the first coil layer are reduced. Therefore, it is possible to easily manufacture the first helical coil and the second helical coil while decreasing the total inductance, and to easily assemble the coil device.

In some aspects, the first conductive wire may be disposed in a first coil layer, and the second conductive wire may be disposed in a second coil layer apart from the first coil layer in the direction of the axis. According to this arrangement, the power transmission coil device may suppress generation of Joule heat while ensuring a desired inductance.

In some aspects, the coil device may further include a magnetic member including a main surface intersecting the axis, the first helical coil may have a first inductance based on a distance between the first conductive wire and the main surface, the second helical coil may have a second inductance based on a distance between the second conductive wire and the main surface, and the first helical coil and the second helical coil may be configured such that a difference between the first inductance and the second inductance is large. According to this configuration, it is possible to set a difference in inductance according to a desired design condition.

In some aspects, the first conductive wire may have a first input portion and a first output portion, the second conductive wire may have a second output portion and a second input portion, the first input portion may be twisted with the second output portion and connected to the second input portion, and the second output portion may be twisted with the first output portion and connected to the first input portion.

In the power transmission coil device, the first input portion and the second output portion are twisted together. This structure is a so-called twisted pair cable structure. Therefore, magnetic fluxes resulting from currents flowing through the first conductive wire and the second conductive wire cancel each other out, and thus generation of noise may be suppressed. In addition, currents corresponding to noise generated by magnetic flux acting from the outside cancel each other out, and thus it is possible to suppress an influence of magnetic flux acting from the outside. According to this configuration, the first input portion and the second output portion twisted together may be disposed to extend from the outside of a helix. In addition, the second input portion and the first output portion twisted together may be disposed to extend from the inside of the helix. Therefore, when the first helical coil and the second helical coil are stacked, each wiring design may be facilitated.

Hereinafter, embodiments of the disclosure will be described with reference to drawings. In description of the drawings, the same reference symbol will be assigned to the same element, and a repeated description will be omitted. In addition, each of the drawings is prepared for description and drawn to particularly emphasize a target part of the description. For this reason, a ratio of dimensions of respective members in the drawings may not be the same as an actual ratio.

First Embodiment

A description will be given of a power transmission coil device according to a first embodiment and a wireless power transfer system including the power transmission coil device. As illustrated in FIG. 1, the wireless power transfer system 1 includes a power transmission coil device 2 and a power reception coil device 3. The wireless power transfer system 1 wirelessly supplies power from the power transmission coil device 2 to the power reception coil device 3. The power transmission coil device 2 and the power reception coil device 3 are disposed to separate from each other in a vertical direction (facing direction). For example, the power transmission coil device 2 is installed on a road surface R of a parking lot, etc. For example, the power reception coil device 3 is mounted in an electric vehicle (movable object) EV. The wireless power transfer system 1 is configured to supply power to the electric vehicle EV arriving at the parking lot, etc. using magnetic coupling between coils of a magnetic field resonance scheme, an electromagnetic induction scheme, etc.

The power transmission coil device 2 is provided to protrude upward from the road surface R. The power transmission coil device 2 has a shape of a flat frustum or a rectangular parallelepiped. A controller, an inverter, etc. (not illustrated) is connected to the power transmission coil device 2. Desired AC power generated by a DC power source or an AC power source is supplied to the power transmission coil device 2. The power transmission coil device 2 supplied with the AC power generates magnetic flux. The power transmission coil device 2 may be buried in the road surface R rather than protruding from the road surface R.

Hereinafter, a coil device according to an embodiment of the disclosure will be described as an example of a specific configuration of the power transmission coil device 2.

The power transmission coil device 2 includes a power transmission coil portion 4 that generates magnetic flux and a housing 6 that accommodates the power transmission coil portion 4. The housing 6, which is flat, includes a base 7 and a protective cover 8. The base 7 is fixed to the road surface R. The protective cover 8 is fixed to the base 7 to form an accommodation space between the protective cover 8 and the base 7. For example, the base 7 and the protective cover 8 are made of a resin or nonmagnetic and electrically conductive material (for example, aluminum). The power transmission coil portion 4 includes a ferrite plate 9 corresponding to a rectangular plate-shaped magnetic member, a first helical coil 11, and a second helical coil 12. The first and second helical coils 11 and 12 are disposed on a main surface 9a of the ferrite plate 9.

The first helical coil 11 has a first conductive wire 13 corresponding to a litz wire. The first conductive wire 13 is held by a first holding member 12. For example, the first holding member 12 has a shape of a rectangular flat plate. A groove in which the first conductive wire 13 is disposed is formed on a surface of the first holding member 12. The second helical coil 12 has a second conductive wire 14 corresponding to a litz wire. The second conductive wire 14 is held by a second holding member 22. For example, the second holding member 22 has a shape of a rectangular flat plate. A groove in which the second conductive wire 14 is disposed is formed on a surface of the second holding member 22. The first and second holding members 21 and 22 may correspond to separate bodies or may be integrally molded. When the first and second holding members 21 and 22 are integrally molded, grooves are formed on both one surface and the other surface of an integrally molded member. When the first and second holding members 21 and 22 correspond to separate bodies, a groove of each of the members may be provided on either a surface on the protective cover 8 side or a surface on the base 7 side. In FIG. 1, the groove of the first holding member 21 is provided on the surface on the base 7 side. The groove of the second holding member 22 is provided on the surface on the protective cover 8 side. When compared to a case in which the groove of the first holding member 21 is provided on the surface on the protective cover 8 side, the first conductive wire 13 is close to the ferrite plate 9. As a result, heat generated in the first conductive wire 13 is efficiently released to the outside of the power transmission coil device 2 (or the power reception coil device 3) through the ferrite plate 9. In addition, when compared to a case in which the groove of the second holding member 22 is provided on the surface on the base 7 side, the second conductive wire 14 is close to the protective cover 8. As a result, heat generated in the second conductive wire 14 is efficiently released to the outside of the power transmission coil device 2 (or the power reception coil device 3) through the protective cover 8.

Figure 2:
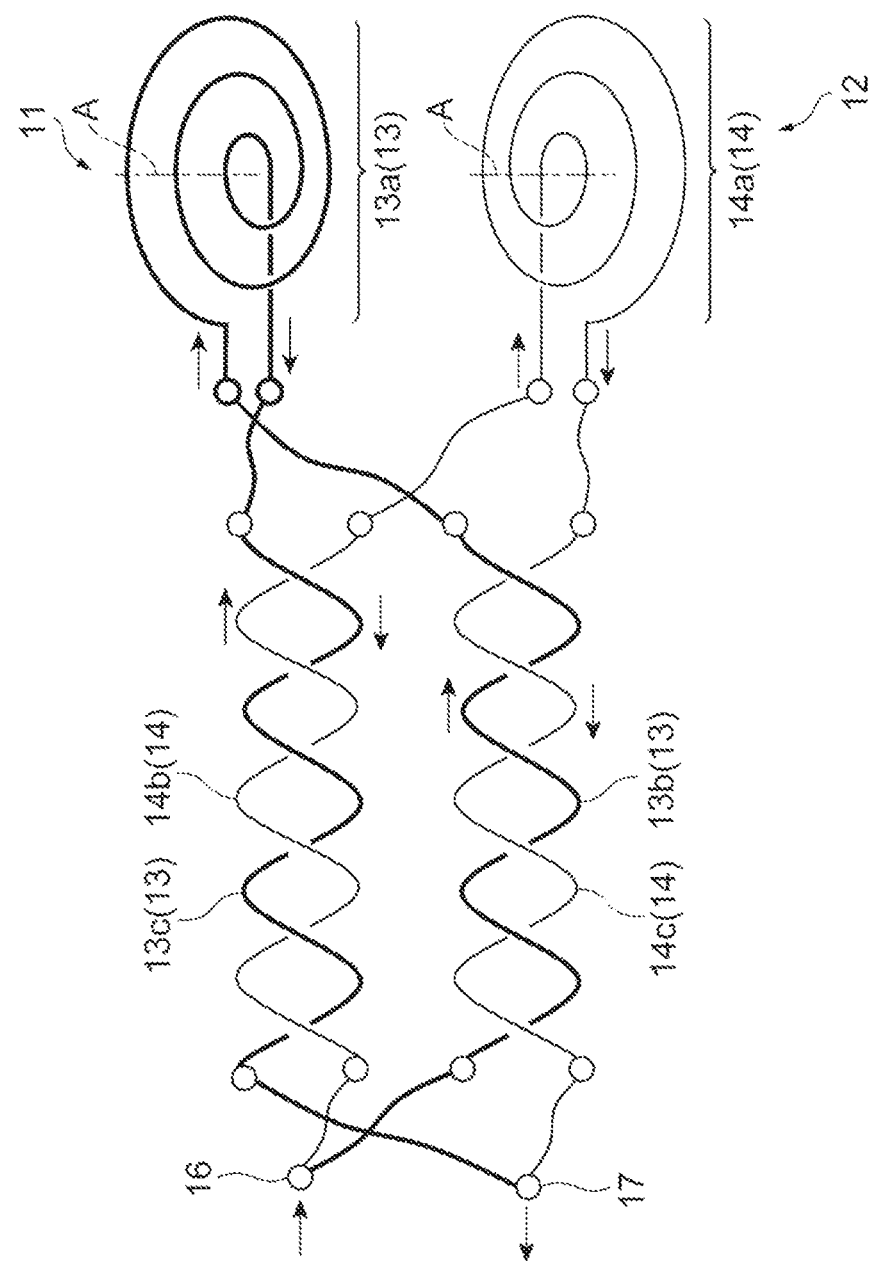
FIG. 2 is a cross-sectional view illustrating a configuration of a power transmission coil portion included in the power transmission coil device illustrated in FIG. 1.

FIG. 2 is a diagram schematically illustrating an electrical connection configuration of the first helical coil 11 and the second helical coil 12. As illustrated in FIG. 2, the first conductive wire 13 includes a spiral portion 13a, a first input portion 13b, and a first output portion 13c. The first input portion 13b is provided at one end portion of the spiral portion 13a. The first output portion 13c is provided at the other end portion of the spiral portion 13a. The other end portion mentioned herein refers to an end portion extending from the inside of the first conductive wire 13 wound in a helical shape. The inside refers to a side close to an axis A in the helical-shaped spiral portion 13a. The outside refers to a side far from the axis A. The spiral portion 13a is a part of the first conductive wire 13 wound around the axis A in a helical shape (spiral shape). In the first helical coil 11, the first conductive wire 13 is wound in right-handed winding from the outside toward the inside in the spiral portion 13a. The axis A is a line parallel to a normal direction of the main surface 9a of the ferrite plate 9. The axis A intersects the main surface 9a. Such a first helical coil 11 is also referred to as a spiral coil or a circular coil.

The second helical coil 12 has substantially the same configuration as that of the first helical coil 11. That is, the second conductive wire 14 includes a spiral portion 14a, a second input portion 14b, and a second output portion 14c. The second input portion 14b is provided at one end portion of the spiral portion 14a. The second output portion 14c is provided at the other end portion of the spiral portion 14a. In the second helical coil 12, the second conductive wire 14 is wound in left-handed winding from the outside toward the inside in the spiral portion 13a. Here, lengths of the first conductive wire 13 and the second conductive wire 14 included in the respective spiral portions 13a and 14a correspond to substantially the same length.

Here, a further description will be given of terminal processing of the input/output portions included in the first helical coil 11 and the second helical coil 12.

The first helical coil 11 and the second helical coil 12 are electrically connected in parallel. Therefore, from an electrical point of view, the first input portion 13b is connected to the second input portion 14b at an input terminal 16. In addition, the first output portion 13c is connected to the second output portion 14c at an output terminal 17.

Meanwhile, from a structural point of view, the first input portion 13b and the second output portion 14c are twisted together. A structure in which these two conductive wires are twisted together corresponds to a so-called twisted pair cable structure. Similarly, the second input portion 14b and the first output portion 13c are twisted together to form a twisted pair cable structure.

Figure 3:
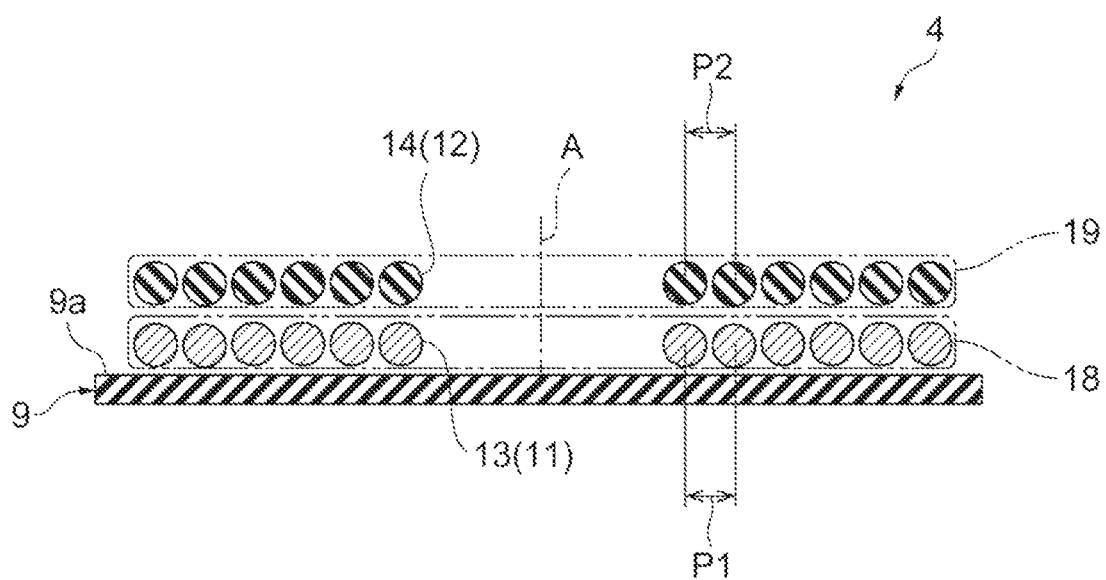
FIG. 3 is a diagram schematically illustrating an electrical connection configuration of the power transmission coil device illustrated in FIG. 1.

As illustrated in FIG. 3, a first coil layer 18 and a second coil layer 19 are stacked in this order on the ferrite plate 9. The first conductive wire 13 in the spiral portion 13a (see FIG. 2) and the second conductive wire 14 in the spiral portion 14a (see FIG. 2) are disposed in the first coil layer 18 and the second coil layer 19. Alternatively, the first conductive wire 13 in the spiral portion 13a (see FIG. 2) or the second conductive wire 14 in the spiral portion 14a (see FIG. 2) are disposed in the first coil layer 18 and the second coil layer 19. In the power transmission coil portion 4 of the first embodiment, the first coil layer 18 includes the first conductive wire 13 in the spiral portion 13a (see FIG. 2). The second coil layer 19 includes the second conductive wire 14 in the spiral portion 14a (see FIG. 2). In such a configuration, the spiral portion 13a (see FIG. 2) of the first helical coil 11 and the spiral portion 14a (see FIG. 2) of the second helical coil 12 may be regarded as planar coils. In the power transmission coil portion 4, the first coil layer 18 and the second coil layer 19 are set in this order from the ferrite plate 9 side. Then, the first helical coil 11 and the second helical coil 12 are stacked in this order. That is, the first conductive wire 13 and the second conductive wire 14 are stacked in an order of the first conductive wire 13 and the second conductive wire 14 along a direction of the axis A from the main surface 9a of the ferrite plate 9.

The first and second helical coils 11 and 12 have the same number (6 times) of turns. Therefore, in a cross section illustrated in FIG. 3, a cross section of twelve first conductive wires 13 and a cross section of twelve second conductive wires 14 are shown. In the spiral portion 13a of the first helical coil 11, an interval between first conductive wires 13 (that is, a conductive wire pitch P1) corresponds to an equal interval. Similarly, in the spiral portion 13a of the second helical coil 12, a conductive wire pitch P2 of the second conductive wire 14 corresponds to an equal interval. In addition, the conductive wire pitch P1 of the first helical coil 11 is substantially the same as the conductive wire pitch P2 of the second helical coil 12. In short, the second helical coil 12 is structurally different from the first helical coil 11 in the winding direction in the spiral portion 14a, and the other physical structure is the same.

Hereinafter, a description will be given of effects of the power transmission coil device 2 while contrasting with effects of a coil device according to Comparative Example 1.

The coil device according to Comparative Example 1 is a single-layer helical coil. A length of a conductive wire included in this helical coil corresponds to a length obtained by adding the length of the first conductive wire 13 to the length of the second conductive wire 14. When the length of the conductive wire is set, the number of turns corresponding to the length of the conductive wire is obtained. When the number of turns is obtained, an inductance based on the number of turns is determined. That is, the coil device according to Comparative Example 1 electrically corresponds to a configuration in which the first conductive wire 13 and the second conductive wire 14 of the present embodiment are connected in series. The number of turns is obtained from the given length of the conductive wire using an inner diameter and an external shape of the coil, a diameter of the conductive wire and a conductive wire pitch. In addition, electric resistance corresponding to the length of the conductive wire is obtained. Further, Joule heat based on this electric resistance is generated.

Meanwhile, the power transmission coil portion 4 of the present embodiment includes the first helical coil 11 and the second helical coil 12 corresponding to two helical coils. Therefore, the power transmission coil portion 4 is considered to be a portion obtained by magnetically coupling the first helical coil 11 and the second helical coil 12. A total inductance of the power transmission coil portion 4 is determined based on a degree of this magnetic coupling. Hereinafter, the inductance of the power transmission coil portion 4 will be referred to as a total inductance (LD), an inductance of the first helical coil 11 will be referred to as a first inductance (L1), and an inductance of the second helical coil 12 will be referred to as a second inductance (L2). The total inductance (LD) of the power transmission coil portion 4 is based on a degree of magnetic coupling between the first helical coil 11 and the second helical coil 12.

First, a description will be given of the degree of magnetic coupling between the first helical coil 11 and the second helical coil 12. The first conductive wire 13 and the second conductive wire 14 are arranged along a direction of the axis A at respective helical locations. According to such an arrangement, a degree of magnetic coupling between a magnetic field of the first conductive wire 13 and a magnetic field of the second conductive wire 14 increases. The degree of magnetic coupling is indicated by a so-called coupling coefficient (k). In the power transmission coil device 2, the first conductive wire 13 and the second conductive wire 14 are arranged along the axis A. According to this arrangement of the first conductive wire 13 and the second conductive wire 14, it is possible to approximate a maximum value of a theoretical coupling coefficient.

Further, the degree of magnetic coupling will be described. As described above, in the power transmission coil portion 4, the first helical coil 11 and the second helical coil 12 are connected in parallel. The first helical coil 11 and the second helical coil 12 are stacked in the direction of the axis A. That is, the power transmission coil portion 4 has a two-layer parallel structure. The total inductance (LD) of the power transmission coil portion 4 having the two-layer parallel structure is shown in Equation (1).

[Equation 1]

$$L_D = \frac{(L_2 + M) \times (L_1 + M)}{L_2 + L_1 + 2 \times M} \quad (1)$$

$L_D$: Total inductance of power transmission coil portion 4
$L_1$: First inductance of first helical coil 11
$L_2$: second inductance of second helical coil 12
M: Mutual inductance of first helical coil 11 and second helical coil 12

The mutual inductance (M) is based on mutual induction occurring between the first helical coil 11 in the first coil layer 18 and the second helical coil 12 in the second coil layer 19.

Here, it is presumed that the first inductance (L1) is equal to the second inductance (L1=L2=L). According to this presumption, Equation (2) is obtained from Equation (1). In addition, according to this presumption, the mutual inductance (M) is expressed by Equation (3). A coefficient (k) of Equation (3) indicates a degree of magnetic coupling between coils. The coefficient (k) of Equation (3) is a so-called coupling coefficient. The coupling coefficient (k) is a number greater than or equal to 0 and less than or equal to 1 ($0 \leq k \leq 1$). The coupling coefficient (k) corresponds to a relative positional relationship between the first helical coil 11 and the second helical coil 12. Depending on the positional relationship between the first helical coil 11 and the second helical coil 12, the coupling coefficient k may be set to 0.8 or more. When the coupling coefficient k corresponds to 0.8, the total inductance (LD) is 0.9 L.

[Equation 2]

$$L_D = \frac{L + M}{2} \quad (2)$$

[Equation 3]

$$M = k \times \sqrt{L_1 \times L_2} = k \times L \quad (3)$$

Next, a description will be given of Joule heat of the first and second helical coils 11 and 12. In the power transmission coil portion 4, the first conductive wire 13 and the second conductive wire 14 are connected in parallel. Therefore, electric resistance of the power transmission coil portion 4 is expressed by Equation (4).

[Equation 4]

$$R_D = \frac{1}{1/R_1 + 1/R_2} = \frac{R}{2} \quad (4)$$

$R_D$: Total electric resistance of power transmission coil portion 4
$R_1$: Electric resistance of first helical coil 11
$R_2$: Electric resistance of second helical coil 12

The length of the first conductive wire 13 in the spiral portion 13*a* is equal to the length of the second conductive wire 14 in the spiral portion 14*a*. Then, for example, the total electric resistance (RD) of the power transmission coil portion 4 is ½ of the electric resistance (R1) of the first helical coil 11. Since Joule heat is proportional to the electric resistance ($Q = R \times I^2 \times t$), when the electric resistance becomes ½ thereof, Joule heat of the first and second helical coils 11 and 12 also becomes ½ thereof. Therefore, since the first helical coil 11 and the second helical coil 12 are connected to each other in parallel, generation of Joule heat is suppressed.

Therefore, in the power transmission coil device 2, the first conductive wire 13 and the second conductive wire 14 are arranged in the direction of the axis A, and thus a degree of magnetic coupling (coupling coefficient k) acting in a direction of increasing the total inductance (LD) is ensured at a desired value. Further, since the first helical coil 11 and the second helical coil 12 are electrically connected in parallel, generation of Joule heat is suppressed. Therefore, the power transmission coil device 2 may suppress Joule heat while ensuring a desired inductance.

In addition, in the power transmission coil device 2, the input/output portions of the first helical coil 11 and the second helical coil 12 form a so-called twisted pair cable structure. According to this cable structure, magnetic fluxes resulting from currents flowing through the first conductive wire 13 and the second conductive wire 14 cancel each other out. Therefore, the power transmission coil device 2 may reduce noise radiated from the power transmission coil device 2 to the outside. In addition, when magnetic flux acts on the first conductive wire 13 and the second conductive wire 14 from the outside, there is a possibility that noise resulting from external magnetic flux may be superimposed on the currents flowing through the first conductive wire 13 and the second conductive wire 14. According to the twisted pair cable structure of the first conductive wire 13 and the second conductive wire 14, currents corresponding to noise generated by magnetic flux acting from the outside cancel each other out. Therefore, the power transmission coil device 2 may suppress an influence of magnetic flux acting from the outside.

Further, in the power transmission coil device 2, the first input portion 13*b* and the second output portion 14*c* twisted together extend from the outside of the spiral portions 13*a* and 14*a*. In addition, the second input portion 14*b* and the first output portion 13*c* twisted together extend from the inside of the spiral portions 13*a* and 14*a*. Therefore, when the first helical coil 11 and the second helical coil 12 are stacked, each wiring design becomes easy.

Second Embodiment

Next, a description will be given of a power transmission coil device 2 according to a second embodiment.

In description of the first embodiment, when the total inductance (LD) is calculated, it has been presumed that the first inductance (L1) of the first helical coil 11 is equal to the second inductance (L2) of the second helical coil. However, even when the first helical coil 11 and the second helical coil 12 have the same physical configuration and electrical configuration, the first inductance (L1) and the second inductance (L2) may not be strictly the same in some cases. For example, the first helical coil 11 and the second helical coil 12 may be disposed on the ferrite plate 9. The ferrite plate 9 is magnetized in a magnetic field. Therefore, magnetic flux from the ferrite plate 9 affects the inductances of the first helical coil 11 and the second helical coil 12. In addition, since a distance from the ferrite plate 9 to the first helical coil 11 is different from a distance from the ferrite plate 9 to the second helical coil 12, the first inductance (L1) and the second inductance (L2) may not be strictly the same.

For example, it is presumed that the first helical coil 11 and the second helical coil 12 have the same physical and electrical configuration. When the presence of the ferrite plate 9 is ignored, a magnitude of the first inductance (L1) is the same as a magnitude of the second inductance (L2). On the other hand, when the presence of the ferrite plate 9 is considered, the first inductance (L1) of the first helical coil 11 close to the ferrite plate 9 is larger than the second inductance (L2) of the second helical coil 12 far from the ferrite plate 9. When a difference in inductance occurs between two coils, an amount of current flowing through the first helical coil 11 is different from an amount of current flowing through the second helical coil 12. This difference in amount of current is also referred to as a current deviation. The current deviation may be a cause of Joule heat in the first and second helical coils 11 and 12.

Therefore, the power transmission coil device of the second embodiment has a configuration for reducing an inductance difference ($\Delta L = |L1 - L2|$) between the first inductance (L1) of the first helical coil 11 and the second inductance (L2) of the second helical coil 12. Hereinafter, the configuration for reducing the inductance difference ($\Delta L$) will be described in detail.

Figure 4:
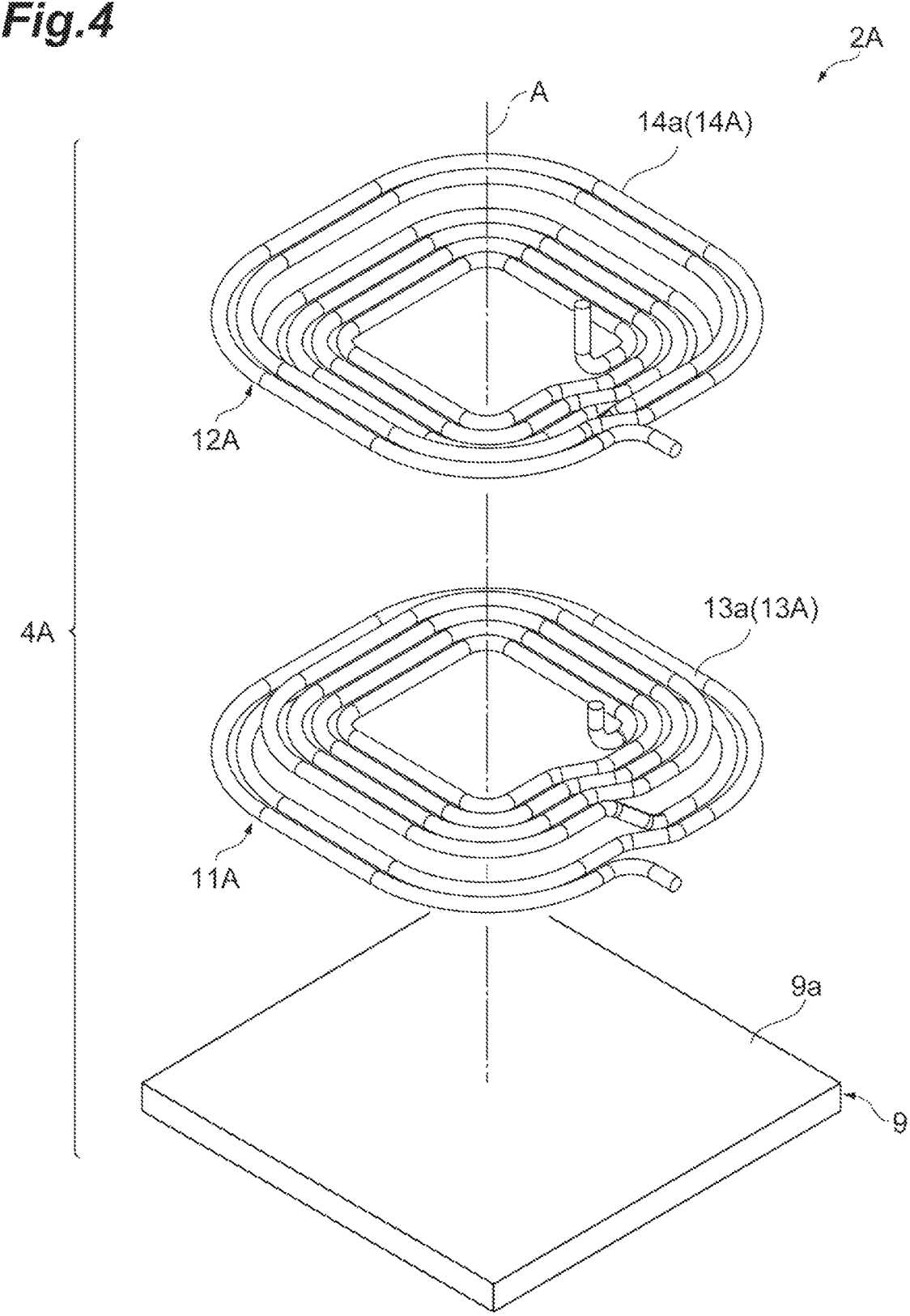
FIG. 4 is an exploded perspective view illustrating a configuration of a power transmission coil portion included in a power transmission coil device according to a second embodiment of the disclosure.
Figure 5:
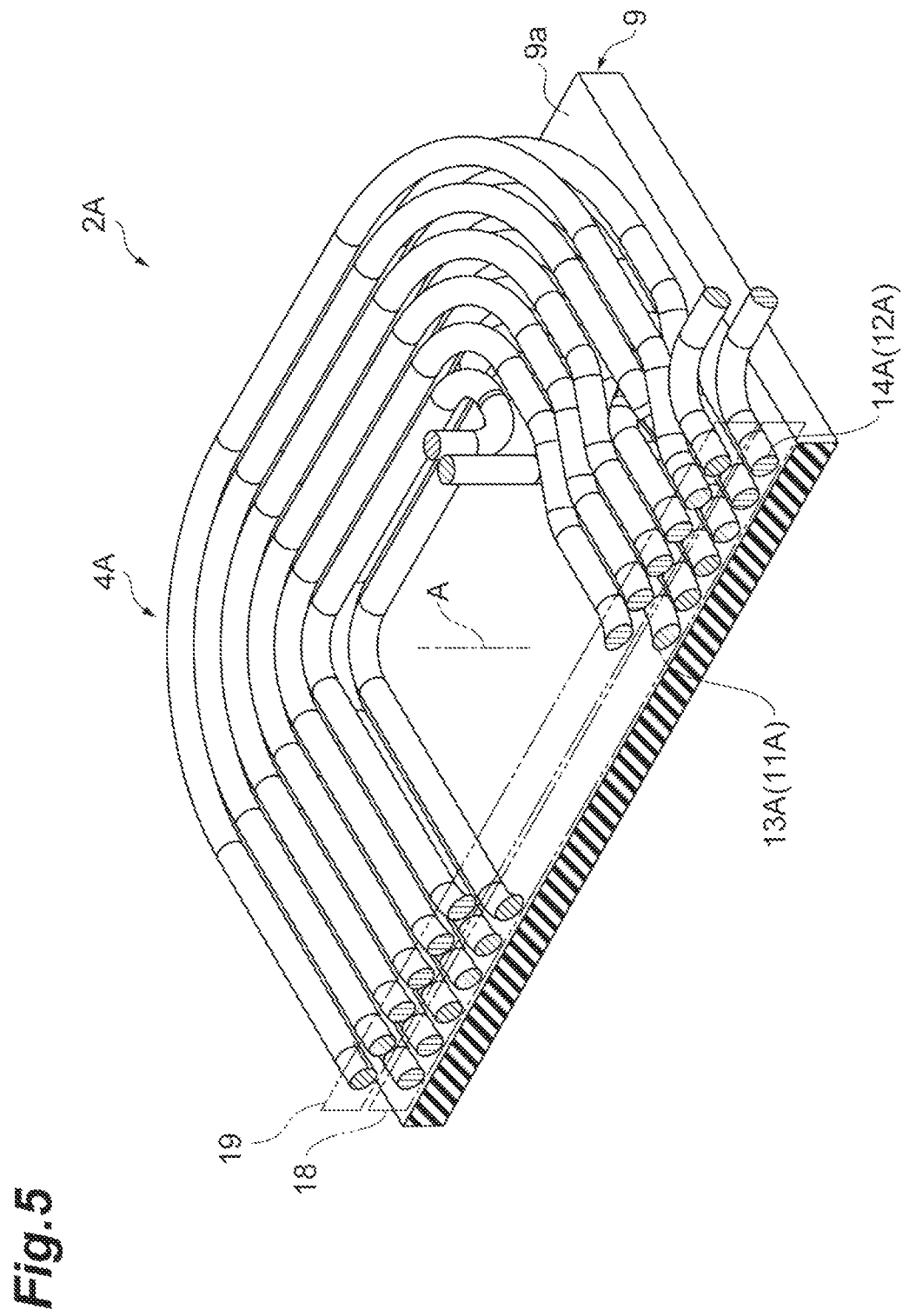
FIG. 5 is a perspective view illustrating a cross section of the power transmission coil portion illustrated in FIG. 4.
Figure 6:
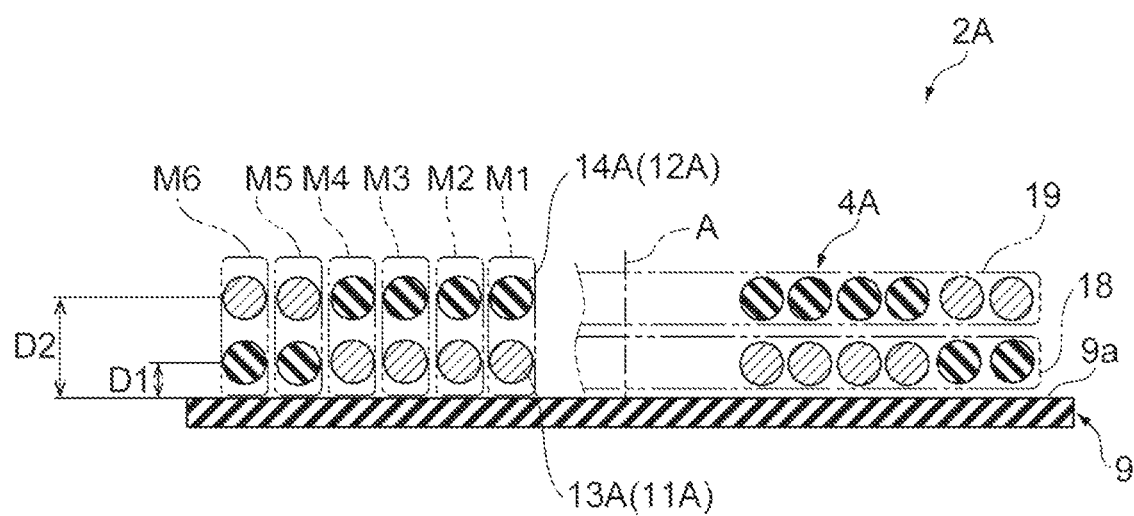
FIG. 6 is a cross-sectional view of the power transmission coil portion illustrated in FIG. 4.

As illustrated in FIG. 4, a power transmission coil device 2A includes a power transmission coil portion 4A. The power transmission coil portion 4A includes a first helical coil 11A and a second helical coil 12A disposed on a ferrite plate 9. As illustrated in FIG. 5 and FIG. 6, in a spiral portion 13*a* (see FIG. 4) of the first helical coil 11A, a first conductive wire 13A is disposed in each of a first coil layer 18 and a second coil layer 19. In a spiral portion 14*a* (see FIG. 4) of the second helical coil 12A, a second conductive wire 14A is disposed in each of the first coil layer 18 and the second coil layer 19. In other words, the first coil layer 18 includes a portion of the first conductive wire 13A and a portion of the second conductive wire 14A. In addition, the second coil layer 19 includes another portion of the first conductive wire 13A and another portion of the second conductive wire 14A. That is, the first conductive wire 13A and the second conductive wire 14A are disposed in both the first coil layer 18 and the second coil layer 19.

The first and second helical coils 11A and 12A have six turns. In a cross section illustrated in FIG. 6, a cross section of twelve first conductive wires 13A and a cross section of twelve second conductive wires 14A are shown. Here, for convenience of description, the first conductive wire 13A and the second conductive wire 14A includes a first winding portion M1, a second winding portion M2, a third winding portion M3, a fourth winding portion M4, a fifth winding portion M5, and a sixth winding portion M6 in order from a side close to the axis A.

In the first coil layer 18, the first conductive wire 13A is disposed in the first, second, third, and fourth winding portions M1, M2, M3, and M4, and the second conductive wire 14A is disposed in the fifth and sixth winding portions M5 and M6. Meanwhile, in the second coil layer 19, the second conductive wire 14A is disposed in the first, second, third, and fourth winding portions M1, M2, M3, and M4, and the first conductive wire 13A is disposed in the fifth and sixth winding portions M5 and M6. Therefore, in the first, second, third, and fourth winding portions M1, M2, M3, and M4, the first conductive wire 13A and the second conductive wire 14A are disposed in this order on a main surface 9a of the ferrite plate 9. That is, the first conductive wire 13A and the second conductive wire 14A are arranged in this order along a direction of the axis A away from the ferrite plate 9. Meanwhile, in the fifth and sixth winding portions M5 and M6, the second conductive wire 14A and the first conductive wire 13A are disposed in this order on the main surface 9a of the ferrite plate 9. That is, the second conductive wire 14A and the first conductive wire 13A are arranged in this order along the direction of the axis A away from the ferrite plate 9.

Paying attention to the first conductive wire 13A, a layer in which the first conductive wire 13A is disposed is changed from the first coil layer 18 to the second coil layer 19 between the fourth winding portion M4 and the fifth winding portion M5. Meanwhile, paying attention to the second conductive wire 14A, a layer in which the second conductive wire 14A is disposed is changed from the second coil layer 19 to the first coil layer 18 between the fourth winding portion M4 and the fifth winding portion M5.

As described above, a distance (D1) from the ferrite plate 9 to the first conductive wire 13 is a variable for determining the first inductance (L1). Similarly, a distance (D2) from the ferrite plate 9 to the second conductive wire 14 is a variable for determining the second inductance (L2). Therefore, the power transmission coil device 2A of the second embodiment has a configuration for reducing the inductance difference (ΔL) between the first inductance (L1) of the first helical coil 11A and the second inductance (L2) of the second helical coil 12. Specifically, in the power transmission coil device 2A, an average distance difference (ΔE) between an average distance (E1) from the ferrite plate 9 to the first helical coil 11 and an average distance (E2) from the ferrite plate 9 to the second helical coil 12 is reduced.

Here, a distance from the main surface 9a of the ferrite plate 9 to the first coil layer 18 is a distance (D1). A distance from the main surface 9a of the ferrite plate 9 to the second coil layer 19 is a distance (D2). Then, when the first helical coil 11 is disposed in the first coil layer 18 as in the power transmission coil portion 4 of the first embodiment, the average distance (E1) of the first helical coil 11 is the distance (D1). The average distance (E2) of the second helical coil 12 is the distance (D2). Then, the average distance difference (ΔE) is ΔE=E2−E1=D2−D1. In this case, the average distance difference (ΔE) is a maximum value of a difference between the average distance (E1) and the average distance (E2). When the average distance difference (ΔE) is reduced, the average distance (E1) of the first helical coil 11A and the average distance (E2) of the second helical coil 12A may be made close to each other.

Ideally, for example, when the average distance (E1) is equal to the average distance (E2) (E1=E2), the average distance difference (ΔE) is zero. That is, when a length of the first conductive wire 13A disposed in the first coil layer 18 is equal to a length of the second conductive wire 14A disposed in the second coil layer 19, the average distance (E1) is E1=(D1+D2)/2. Similarly, when a length of the second conductive wire 14 disposed in the first coil layer 18 is equal to a length of the second conductive wire 14 disposed in the second coil layer 19, the average distance (E2) is E2=(D1+D2)/2.

This average distance difference (ΔE) may not be zero. That is, the average distance difference (ΔE) may be smaller than the maximum value (distance (D2−D1)) of the difference described above. Therefore, a portion of the first conductive wire 13A in the spiral portion 13a is disposed in the first coil layer 18. Further, the other portion is disposed in the second coil layer 19. Then, the average distance (E1) of the first helical coil 11A is larger than that in a case in which the whole first conductive wire 13 in the spiral portion 13a is disposed in the first coil layer 18. Therefore, the average distance (E1) of the first helical coil 11A approaches the average distance (E2) of the second helical coil 12A. Meanwhile, a portion of the second conductive wire 14A in the spiral portion 14a is disposed in the first coil layer 18. Further, the other portion is disposed in the second coil layer 19. Then, the average distance (E2) of the second helical coil 12A is smaller than that in a case in which the whole second conductive wire 14A in the spiral portion 14a is disposed in the second coil layer 19. Therefore, the average distance (E2) of the second helical coil 12A approaches the average distance (E1) of the first helical coil 11A.

Therefore, in the power transmission coil portion 4A of the second embodiment, arrangement of the first conductive wire 13A and the second conductive wire 14A is made different between a region (the sixth winding portion M6) on an outermost side and a region (the fifth winding portion M5) adjacent thereto, and a region (the first, second, third, and fourth winding portions M1, M2, M3, and M4) on an inner side of the regions, which is based on the fact that a length of a conductive wire required for one turn is longer on an outer side. That is, in order to equalize the lengths of the conductive wire disposed in the first coil layer 18 and the conductive wire disposed in the second coil layer 19, the number of turns of the conductive wire in the first coil layer 18 may be made different from the number of turns of the conductive wire in the second coil layer 19. According to the power transmission coil portion 4A, the average distance difference (4E) between the average distance (E1) in the first helical coil 11A and the average distance (E2) in the second helical coil 12A becomes smaller. In this way, it is possible to reduce the average distance difference (ΔE) between the first inductance (L1) of the first helical coil 11A and the second inductance (L2) of the second helical coil 12A. Therefore, according to the power transmission coil device 2A of the second embodiment, a deviation of a current flowing through the first helical coil 11A and the second helical coil 12A is suppressed. Further, Joule heat in the first and second helical coils 11A and 12A is suppressed.

The power transmission coil portion 4A included in the power transmission coil device 2A according to the second embodiment is not limited to the configuration illustrated in FIG. 6.

[Modification 1]

Figure 7:
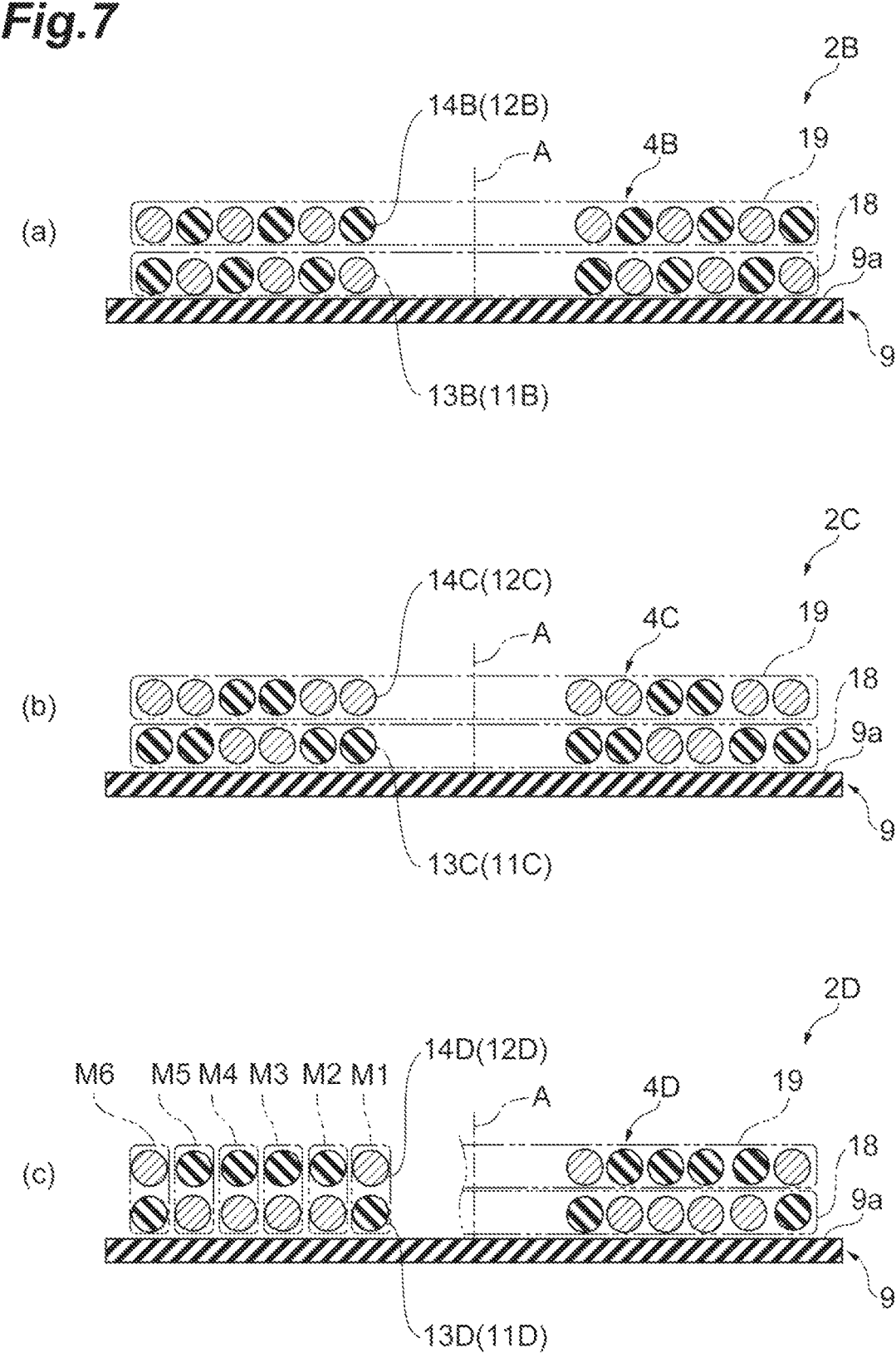
FIG. 7, parts (a)-(c) are cross-sectional views illustrating different modifications of the power transmission coil device according to the second embodiment.

For example, as illustrated in a part (a) of FIG. 7, a power transmission coil device 2B according to Modification 1 includes a power transmission coil portion 4B. In the power transmission coil portion 4B, a first conductive wire 13B and a second conductive wire 14B may be alternately disposed for each turn from the inside toward the outside of the spiral portions 13a and 14a (see FIG. 2) (along a direction intersecting the axis A). That is, a first coil layer 18 and a second coil layer 19 in which the first conductive wire 13B and the second conductive wire 14B are disposed are interchanged for each turn. According to this configuration, it is possible to further reduce an average distance difference (ΔE) between an average distance (E1) of a first helical coil 11B and an average distance (E2) of a second helical coil 12B.

[Modification 2]

As illustrated in a part (b) of FIG. 7, a power transmission coil device 2C according to Modification 2 includes a power transmission coil portion 4C. In the power transmission coil portion 4C, a first conductive wire 13C and a second conductive wire 14C may be alternately disposed for every two turns from the inside toward the outside of the spiral portions 13a and 14a (see FIG. 2). That is, a first coil layer 18 and a second coil layer 19 in which the first conductive wire 13C and the second conductive wire 14C are disposed are interchanged for every two turns. According to this configuration, it is possible to adopt a simple structure, and to reduce the inductance difference (ΔL) between the first inductance (L1) and the second inductance (L2). Therefore, it is possible to efficiently manufacture the power transmission coil device 2C. The first coil layer 18 and the second coil layer 19 in the first and second conductive wires 13C and 14C are not limited to be interchanged for each turn (each round). For example, the first coil layer 18 and the second coil layer 19 may be interchanged for every 180 degrees (half round) or for every 90 degrees (¼ round).

[Modification 3]

As illustrated in a part (c) of FIG. 7, a power transmission coil device 2D according to Modification 3 includes a power transmission coil portion 4D. In the power transmission coil portion 4D, a configuration of an innermost side (the first winding portion M1) and a configuration of an outermost side (the sixth winding portion M6) of the spiral portions 13a and 14a (see FIG. 2) may have the same arrangement configuration with respect to a first conductive wire 13D and a second conductive wire 14D, and a region disposed therebetween (the second, third, fourth, and fifth winding portions M2, M3, M4, and M5) may have a different arrangement configuration from an arrangement configuration of the first conductive wire 13D and the second conductive wire 14D on the innermost side (the first winding portion M1) and the outermost side (the sixth winding portion M6) of the helix. According to this configuration, it is possible to facilitate a configuration for reducing the difference between the first inductance (L1) and the second inductance (L2). Therefore, it is possible to efficiently manufacture the power transmission coil device 2D.

[Modification 4]

In the power transmission coil device 2A of the second embodiment, attention has been paid to the arrangement of the first conductive wire 13A and the second conductive wire 14A in the direction of the axis A as a configuration for reducing the difference between the first inductance (L1) and the second inductance (L2). A configuration for reducing the inductance difference (ΔL) is not limited to the arrangement of the first conductive wire 13A and the second conductive wire 14A.

Figure 8:
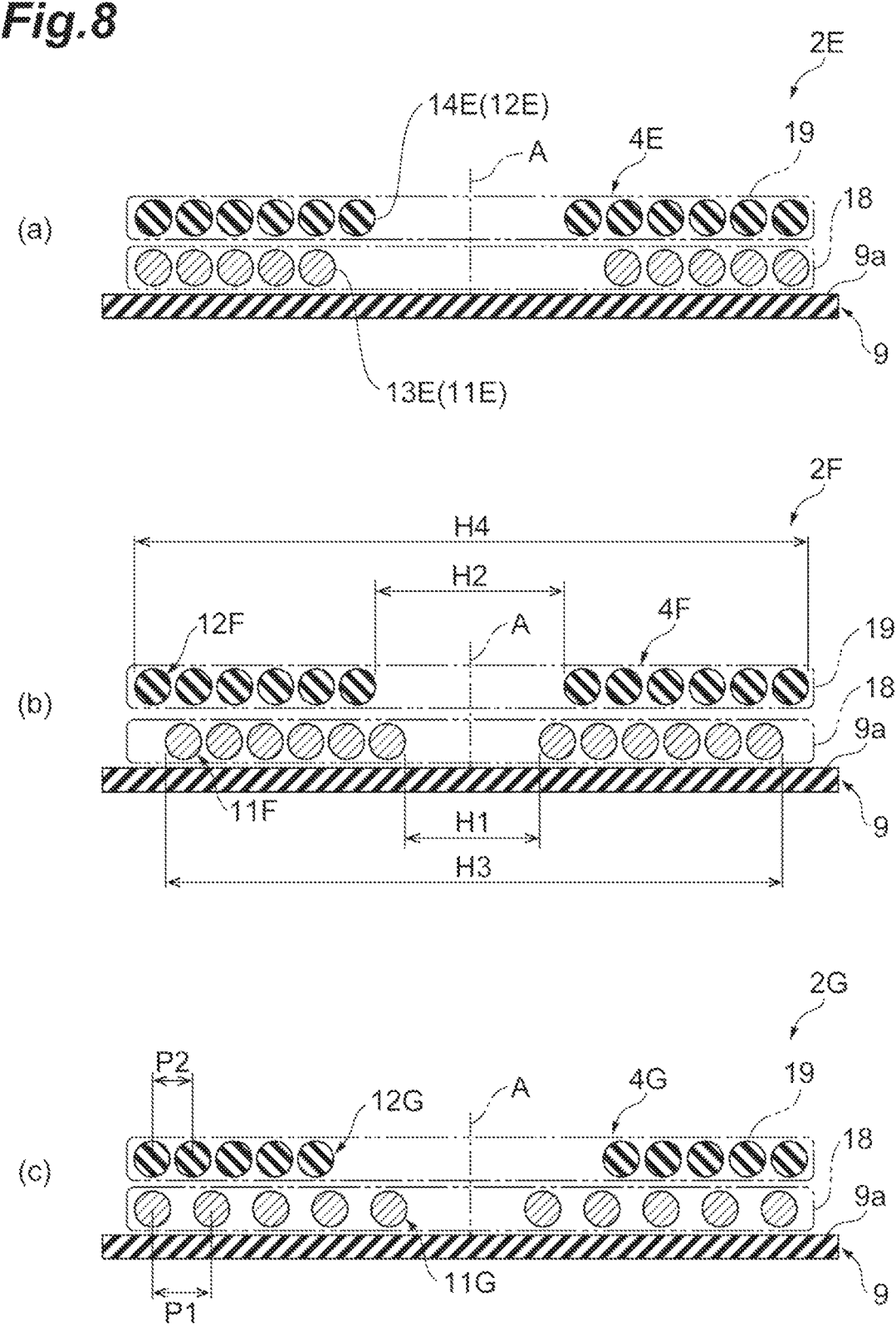
FIG. 8, parts (a)-(c) are cross-sectional views of another modification of the power transmission coil device according to the second embodiment.

The number of turns of a coil is given as another variable that determines an inductance of a helical coil. As illustrated in a part (a) of FIG. 8, a power transmission coil device 2E includes a power transmission coil portion 4E. In the power transmission coil portion 4E, the number of turns of the first helical coil 11E may be different from the number of turns of the second helical coil 12E. In the first helical coil 11E, a whole first conductive wire 13E included in the spiral portion 13a (see FIG. 2) is disposed in a first coil layer 18. Further, the number of turns of the first helical coil 11E is five. In the second helical coil 12E, a whole second conductive wire 14E included in the spiral portion 14a (see FIG. 2) is disposed in a second coil layer 19. Further, the number of turns of the second helical coil 12E is six. That is, the number of turns of the second helical coil 12E far from a ferrite plate 9 is larger than the number of turns of the first helical coil 11E close to the ferrite plate 9. Even though a coil far from the ferrite plate 9 has a small inductance, the inductance becomes larger by increasing the number of turns. Therefore, a difference in inductance due to a position from the ferrite plate 9 may be reduced by adjusting the number of turns.

[Modification 5]

An inner diameter and an outer diameter of a coil are given as still another variable that determines an inductance of a helical coil. As illustrated in a part (b) of FIG. 8, a power transmission coil device 2F includes a power transmission coil portion 4F. In the power transmission coil portion 4F, an inner diameter H1 of a first helical coil 11F may be different from an inner diameter H2 of a second helical coil 12F. In addition, an outer diameter H3 of the first helical coil 11F may be different from an outer diameter H4 of the second helical coil 12F. Specifically, the inner diameter H1 of the first helical coil 11F is smaller than the inner diameter H2 of the second helical coil 12F. Further, the outer diameter H3 of the first helical coil 11F is smaller than the outer diameter H4 of the second helical coil 12F.

[Modification 6]

A conductive wire pitch is given as still another variable that determines an inductance of a helical coil. As illustrated in a part (c) of FIG. 8, a power transmission coil device 2G includes a power transmission coil portion 4G In the power transmission coil portion 4G a conductive wire pitch P1 of a first helical coil 11G may be different from a conductive wire pitch P2 of a second helical coil 12G Specifically, the conductive wire pitch P1 of the first helical coil 11G is larger than the conductive wire pitch P2 of the second helical coil 12G.

According to the power transmission coil devices 2E, 2F, and 2G of the above-described Modifications 4, 5, and 6, when the presence of the ferrite plate 9 is not considered, the first inductance (L1) of the first helical coils 11E, 11F, and 11G is smaller than the second inductance (L2) of the second helical coils 12E, 12F, and 12G However, when the presence of the ferrite plate 9 is considered, an influence of the ferrite plate 9 on the first helical coils 11E, 11F, and 11G is larger than an influence of the ferrite plate 9 on the second helical coils 12E, 12F, and 12G Therefore, when the influence of the ferrite plate 9 is included, the inductance difference (ΔL) between the first inductance (L1) and the second inductance (L2) becomes smaller.

Third Embodiment

A description will be given of a power transmission coil device 2H according to a third embodiment with reference to a part (a) of FIG. 9. The power transmission coil device 2A of the second embodiment is configured to reduce the inductance difference (ΔL) between the first helical coil 11A and the second helical coil 12A to suppress a decrease in total inductance (LD) due to Joule heat. A helical coil has the number of turns of the coil, an inner diameter of the coil, an outer diameter of the coil, a conductive wire pitch, etc. as design variables of an inductance. Then, the inductance difference (ΔL) may be set to a desired value by adjusting these variables. That is, the inductance difference (ΔL) may be set to a small value as in the power transmission coil device 2A of the second embodiment. Conversely, the inductance difference (ΔL) may be set to a large value as in the power transmission coil device 2H according to the third embodiment. Hereinafter, a description will be given of a case in which the ferrite plate 9 is present. However, the inductance difference (ΔL) may be increased by adjusting only the number of turns of the coil, an inner diameter of the coil, an outer diameter of the coil, a conductive wire pitch, etc. without providing the ferrite plate 9.

The power transmission coil device 2H has a configuration for increasing the inductance difference (ΔL). Specifically, the number of turns of the coil is selected as a variable. In a first helical coil 11H, a whole first conductive wire 13H included in the spiral portion 13a (see FIG. 2) is disposed in a first coil layer 18. In a second helical coil 12H, a whole second conductive wire 14H included in the spiral portion 14a (see FIG. 2) is disposed in a second coil layer 19. Further, the number of turns (six times) of the first helical coil 11H is larger than the number of turns (five times) of the second helical coil 12H.

According to this configuration, when the ferrite plate 9 is not considered, the first inductance (L1) is larger than the second inductance (L2). Further, the first helical coil 11H is closer to the ferrite plate 9 than the second helical coil 12H. Therefore, since the first inductance (L1) is further increased by an influence of the ferrite plate 9, the inductance difference (ΔL) between the first inductance (L1) and the second inductance (L2) becomes larger. Therefore, the inductance difference (ΔL) may be set to a desired value.

[Modification 7]

Figure 9:
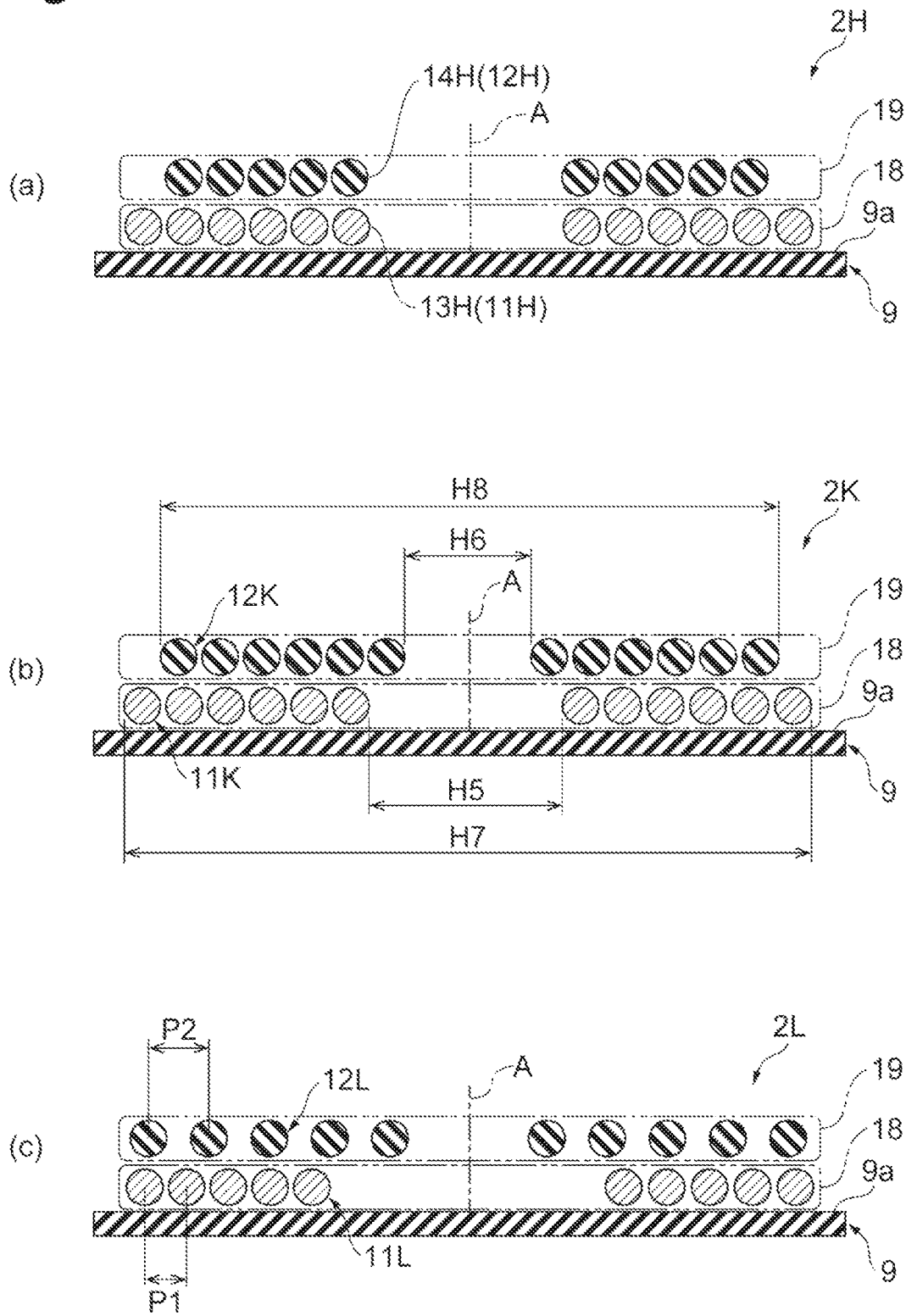
In FIG. 9, a part (a) is a cross-sectional view of a power transmission coil portion included in a power transmission coil device of a third embodiment. A part (b) and a part (c) are cross-sectional views illustrating modifications of the power transmission coil device of the third embodiment.

As illustrated in a part (b) of FIG. 9, in a power transmission coil device 2K according to Modification 7, an inner diameter and an outer diameter of a coil may be selected as variables to have a configuration in which the inductance difference (ΔL) is increased. Specifically, an inner diameter H5 of a first helical coil 11K is larger than an inner diameter H6 of a second helical coil 12K. Further, an outer diameter H7 of a first helical coil 11K is larger than an outer diameter H8 of a second helical coil 12K.

[Modification 8]

As illustrated in a part (c) of FIG. 9, in a power transmission coil device 2L according to Modification 8, conductive wire pitches P1 and P2 may be selected as variables to have a configuration in which the inductance difference (ΔL) is increased. Specifically, a conductive wire pitch P1 of a first helical coil 11L is smaller than a conductive wire pitch P2 of a second helical coil 12L.

[Modifications 9 and 10]

Figure 10:
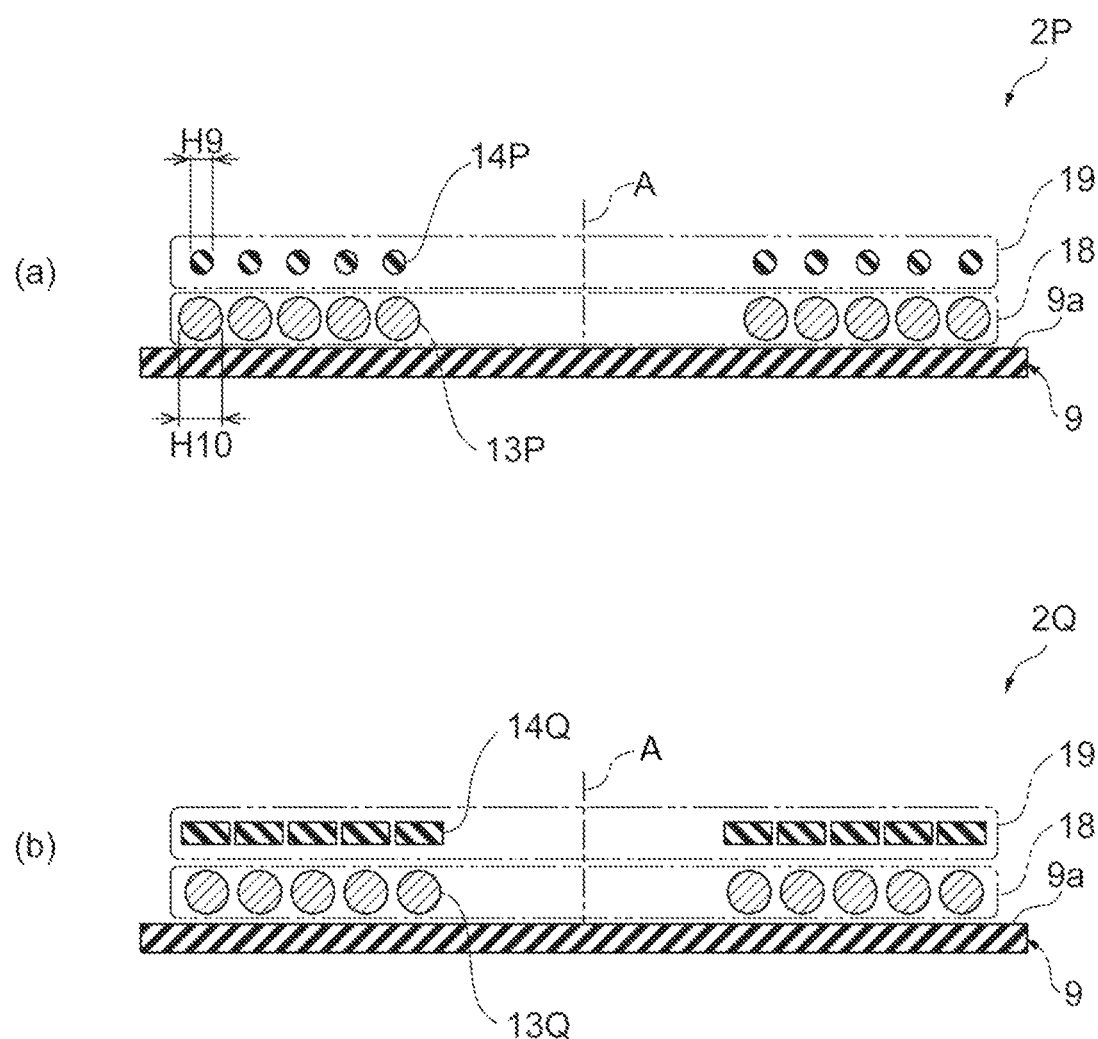
FIG. 10, parts (a)-(b) are cross-sectional views illustrating another modification of the power transmission coil device of the third embodiment.

Cross-sectional dimensions or cross-sectional shapes of the first conductive wire and the second conductive wire affect an inductance. Therefore, the cross-sectional shapes or cross-sectional dimensions of the first conductive wire and the second conductive wire may be adopted as a configuration for increasing the inductance difference (ΔL). Therefore, as illustrated in a part (a) of FIG. 10, in a power transmission coil device 2P according to Modification 9, a wire diameter H9 of a second conductive wire 14P may be set to be smaller than a wire diameter H10 of a first conductive wire 13P to have a configuration in which the inductance difference (ΔL) is increased. As illustrated in a part (b) of FIG. 10, in a power transmission coil device 2Q according to Modification 10, a cross-sectional shape of a first conductive wire 13Q may be set to a circular shape, and a cross-sectional shape of a second conductive wire 14Q may be set to a rectangular shape different from the cross-sectional shape of the first conductive wire 13Q. According to these configurations, it is possible to reduce a thickness of a power transmission coil portion.

According to the power transmission coil device 2H, 2K, 2L, 2P, and 2Q of the above-described third embodiment and Modifications 7 to 10, it is possible to set each of the first inductance (L1) and the second inductance (L2) to a desired value according to a design requirement.

The above-described embodiments show examples of the coil device according to the disclosure. The coil device according to the disclosure is not limited to the coil devices according to the embodiments, and the coil devices according to the embodiments may be modified or applied to another embodiment within a range not changing the subject matter described in each claim.

The above embodiments show an example in which the coil device includes the first helical coil and the second helical coil. However, the coil device of the disclosure is not limited thereto. A technology of the disclosure is applicable to a coil device including three or more coil layers. In this case, the technology of the disclosure may be applied to all the coil layers among the three or more coil layers, and the technology of the disclosure may be applied to at least two layers among the three or more coil layers.

The above embodiments show an example in which litz wires are used as the first conductive wire 13 and the second conductive wire 14. However, the disclosure is not limited thereto, and a conductive wire other than the litz wire may be used as long as the coil device functions as a coil device for wireless power transfer. For example, a type, a mode, a form, a material, a configuration, a shape, and dimensions of the conductive wire 30 are arbitrarily selectable items.

In the above embodiments, a description has been given of a case in which the coil device of the disclosure is applied to the power transmission coil device 2. However, the disclosure is not limited thereto. The coil device of the disclosure may be applied to the power reception coil device 3. In the above embodiments, a description has been given of a case in which the coil device of the disclosure is applied to the wireless power transfer system. However, the disclosure is not limited to the wireless power transfer system. For example, the coil device of the disclosure may be applied to an induction heating system or an eddy current flaw detecting system.

In the above embodiments, a description has been given of a case in which a magnetic member corresponds to the ferrite plate 9. However, the magnetic member is not limited to the ferrite plate 9. The magnetic member may be embodied by another magnetic member (for example, a silicon steel plate, an amorphous magnetic alloy, or a magnet). In particular, from a viewpoint of improving power efficiency, the magnetic material may correspond to a soft magnetic material (for example, ferrite, a silicon steel plate, or an amorphous magnetic alloy).

In the above embodiments, the term "helical shape" should not be construed as being limited to a case in which the shape of the helical coil viewed in the direction of the axis is a circular shape as illustrated in FIG. 2. As long as the helical coil is wound to surround the axis from the outside to the inside or from the inside to the outside and has a planar shape when viewed in a direction perpendicular to the axis A, the shape viewed in the direction of the axis is not limited. For example, as illustrated in FIG. 4, the shape of the helical coil may correspond to a shape including a linear portion or may correspond to a hexagonal shape or an octagonal shape. In addition, in the above embodiments, the helical coil in one coil layer is aligned along the direction perpendicular to the axis A. However, the helical coil is not strictly limited to this mode. The helical coil may be shifted in the direction of the axis A in one coil layer for each different winding portion.

INDUSTRIAL APPLICABILITY

According to a coil device of the disclosure, it is possible to suppress generation of Joule heat while ensuring a desired inductance.

REFERENCE SIGNS LIST

1: wireless power transfer system
2, 2A, 2B, 2C, 2D, 2E, 2F, 2G 2H, 2K, 2L, 2P, 2Q: power transmission coil device
3: power reception coil device
4, 4A, 4B, 4C, 4D, 4E, 4F, 4G: power transmission coil portion
6: housing
7: base
8: protective cover
9: ferrite plate
11, 11A, 11B, 11E, 11F, 11G 11H, 11K, 11L: first helical coil
12, 12A, 12B, 12E, 12F, 12G 12H, 12K, 12L: second helical coil
9a: main surface
13, 13A, 13B, 13C, 13D, 13E, 13H, 13P, 13Q: first conductive wire
13a, 14a: spiral portion
13b: first input portion
13c: first output portion
14, 14A, 14B, 14C, 14D, 14E, 14H, 14P, 14Q: second conductive wire
14b: second input portion
14c: second output portion
16: input terminal
17: output terminal
18: first coil layer
19: second coil layer
21: first holding member
22: second holding member
A: axis
EV: electric vehicle
H1, H2, H5, H6: inner diameter
H3, H4, H7, H8: outer diameter
H9, H10: wire diameter
M1: first winding portion
M2: second winding portion
M3: third winding portion
M4: fourth winding portion
M5: fifth winding portion
M6: sixth winding portion
R: road surface
P1, P2: conductive wire pitch

The invention claimed is:

1. A coil device comprising:
a first helical coil having a first conductive wire forming a helical shape around an axis;
a second helical coil having a second conductive wire forming a helical shape around the axis,
wherein the first helical coil is electrically connected in parallel to the second helical coil,
the first conductive wire is adjacent to the second conductive wire in a direction of the axis,
each of the first conductive wire and the second conductive wire is disposed in a first coil layer and disposed in a second coil layer apart from the first coil layer in the direction of the axis,
the second conductive wire is disposed on an outer side of the first conductive wire in the first coil layer,
the number of turns of the second conductive wire is smaller than the number of turns of the first conductive wire in the first coil layer,
the first conductive wire is disposed on an outer side of the second conductive wire in the second coil layer, and
the number of turns of the first conductive wire is smaller than the number of turns of the second conductive wire in the second coil layer.

2. The coil device according to claim 1, further comprising
a magnetic member including a main surface intersecting the axis,
wherein the first helical coil has a first inductance based on a distance between the first conductive wire and the main surface,
the second helical coil has a second inductance based on a distance between the second conductive wire and the main surface, and
the first helical coil and the second helical coil are configured such that a difference between the first inductance and the second inductance is small.

3. The coil device according to claim 1, wherein the first conductive wire and the second conductive wire are alternately disposed in the first coil layer and the second coil layer along a direction intersecting the axis.

4. The coil device according to claim 1, further comprising
a magnetic member including a main surface intersecting the axis,
wherein the first helical coil has a first inductance based on a distance between the first conductive wire and the main surface,
the second helical coil has a second inductance based on a distance between the second conductive wire and the main surface, and
the first helical coil and the second helical coil are configured such that a difference between the first inductance and the second inductance is large.

5. The coil device according to claim 2,
wherein the first conductive wire has a first input portion and a first output portion,
the second conductive wire has a second output portion and a second input portion,
the first input portion is twisted with the second output portion and connected to the second input portion, and
the second input portion is twisted with the first output portion and connected to the first input portion.

6. The coil device according to claim 3,
wherein the first conductive wire has a first input portion and a first output portion,
the second conductive wire has a second output portion and a second input portion,
the first input portion is twisted with the second output portion and connected to the second input portion, and the second input portion is twisted with the first output portion and connected to the first input portion.

7. The coil device according to claim 4,
wherein the first conductive wire has a first input portion and a first output portion,
the second conductive wire has a second output portion and a second input portion,
the first input portion is twisted with the second output portion and connected to the second input portion, and
the second input portion is twisted with the first output portion and connected to the first input portion.

8. A coil device comprising:
a first helical coil having a first conductive wire forming a helical shape around an axis;
a second helical coil having a second conductive wire forming a helical shape around the axis,
wherein the first helical coil is electrically connected in parallel to the second helical coil,
wherein the first conductive wire is adjacent to the second conductive wire in a direction of the axis,
wherein the first conductive wire has a first input portion and a first output portion,
wherein the second conductive wire has a second output portion and a second input portion,
wherein the first input portion is twisted with the second output portion and connected to the second input portion, and
wherein the second input portion is twisted with the first output portion and connected to the first input portion.

* * * * *